(12) United States Patent
Vincelette et al.

(10) Patent No.: US 10,612,368 B2
(45) Date of Patent: Apr. 7, 2020

(54) TRANSDUCERS AND ACOUSTIC EMITTERS FOR FIBER-OPTIC-BASED ACOUSTIC SENSING

(71) Applicant: Weatherford Technology Holdings, LLC, Houston, TX (US)

(72) Inventors: Andre R. Vincelette, Quebec (CA); Domino Taverner, Delray Beach, FL (US)

(73) Assignee: Weatherford Technology Holdings, LLC, Houston, TX (US)

( * ) Notice: Subject to any disclaimer, the term of this patent is extended or adjusted under 35 U.S.C. 154(b) by 328 days.

(21) Appl. No.: 15/543,105

(22) PCT Filed: Jan. 14, 2016

(86) PCT No.: PCT/US2016/013341
§ 371 (c)(1),
(2) Date: Jul. 12, 2017

(87) PCT Pub. No.: WO2016/118393
PCT Pub. Date: Jul. 28, 2016

(65) Prior Publication Data
US 2018/0320505 A1    Nov. 8, 2018

Related U.S. Application Data

(60) Provisional application No. 62/104,952, filed on Jan. 19, 2015.

(51) Int. Cl.
*G01S 15/89* (2006.01)
*E21B 47/10* (2012.01)
(Continued)

(52) U.S. Cl.
CPC ........ *E21B 47/101* (2013.01); *E21B 47/0007* (2013.01); *E21B 47/065* (2013.01);
(Continued)

(58) Field of Classification Search
CPC ...... E21B 47/101; E21B 47/14; E21B 47/123; E21B 47/1005; E21B 47/10;
(Continued)

(56) References Cited

U.S. PATENT DOCUMENTS

| 2,582,232 A | 1/1952 | Cesaro et al. |
| 2,794,341 A | 6/1957 | Vonnegut |

(Continued)

FOREIGN PATENT DOCUMENTS

| CA | 2972607 A1 * | 7/2016 | ............. B23K 20/10 |
| CA | 2972616 A1 * | 7/2016 | ........... E21B 47/101 |

(Continued)

OTHER PUBLICATIONS

Great Britain Combined Search and Examination Report under Sections 17 and 18(3) dated Sep. 21, 2018, corresponding to Application No. GB1804441.2.

(Continued)

*Primary Examiner* — Daniel Pihulic
(74) *Attorney, Agent, or Firm* — Patterson + Sheridan, LLP (57) ABSTRACT

Mechanical acoustic actuators and methods for using these actuators to generate controlled acoustic signals to measure silent or quiet parameters are provided. One example method includes using fluid flows (whistle) and/or mechanical shocks between solids (bells) to stimulate the actuators, either proportionally from the parameter targeted for measurement or artificially modulated to create emitters. Some aspects provide for usage of the actuators within an oil and gas well or a fluid conduit, including in combination with arrays of acoustic sensors, to perform sonar array processing monitoring of acoustic wave propagation to derive properties of the media traversed.

27 Claims, 5 Drawing Sheets

(51) Int. Cl.
| | |
|---|---|
| *E21B 47/06* | (2012.01) |
| *E21B 49/00* | (2006.01) |
| *E21B 47/00* | (2012.01) |
| *G01N 29/34* | (2006.01) |
| *G01N 29/14* | (2006.01) |
| *G01F 1/66* | (2006.01) |
| *G01N 29/24* | (2006.01) |
| *G01N 29/12* | (2006.01) |
| *G01F 1/36* | (2006.01) |

(52) U.S. Cl.
CPC .............. *E21B 49/00* (2013.01); *G01F 1/666* (2013.01); *G01N 29/12* (2013.01); *G01N 29/14* (2013.01); *G01N 29/2431* (2013.01); *G01N 29/34* (2013.01); *G01S 15/89* (2013.01); *G01F 1/366* (2013.01)

(58) Field of Classification Search
CPC ........ E21B 47/091; E21B 47/09; E21B 34/16; E21B 34/00; E21B 49/00; E21B 47/065; E21B 47/0007; G10K 5/00; G10K 1/06; G10K 1/00; G01V 1/00; G01S 15/88; G01S 15/02; G01S 15/89; G01P 5/02; G01P 5/00; G01N 19/00; G01N 29/34; G01N 29/2431; G01N 29/14; G01N 29/12; G01N 2015/0003; G01K 11/3206; G01K 11/32; G01K 11/22; G01K 5/48; G01H 1/16; G01H 1/12; G01H 1/003; G01F 5/00; G01F 1/20; G01F 1/05; G01F 1/366; G01F 1/666; G01D 5/54; G01D 5/35361; G01D 5/35358; G01D 5/35354; G01D 5/02; G01B 17/00; G01B 5/14; G01B 5/00; F16K 37/0016; F16K 37/0008

See application file for complete search history.

(56) References Cited

U.S. PATENT DOCUMENTS

| | | | |
|---|---|---|---|
| 2,794,371 | A | 6/1957 | Vonnegut |
| 2,936,619 | A | 5/1960 | Gibney |
| 3,557,816 | A | 1/1971 | Small |
| 4,020,693 | A | 5/1977 | Ahlgren et al. |
| 5,772,322 | A | 6/1998 | Burns et al. |
| 2004/0140092 | A1 | 7/2004 | Robison |
| 2005/0086012 | A1 | 4/2005 | Lapinski et al. |
| 2012/0146805 | A1 | 6/2012 | Vick, Jr. et al. |
| 2014/0126332 | A1 | 5/2014 | Skinner |
| 2014/0263426 | A1 | 9/2014 | Gasper |
| 2014/0286129 | A1 | 9/2014 | Longfield et al. |
| 2016/0209584 | A1* | 7/2016 | Vincelette .............. B23K 20/10 |
| 2018/0320505 | A1* | 11/2018 | Vincelette .............. E21B 47/101 |

FOREIGN PATENT DOCUMENTS

| | | | | |
|---|---|---|---|---|
| DE | 2911928 | A1 | 10/1980 | |
| DE | 4317187 | A1 | 11/1994 | |
| EP | 3301253 | A1 | 4/2018 | |
| GB | 1171117 | A | 11/1969 | |
| GB | 2549887 | A * | 11/2017 | |
| GB | 2549888 | A * | 11/2017 | ........... E21B 47/101 |
| GB | 2562837 | A * | 11/2018 | ........ E21B 47/0007 |
| WO | WO-2016118392 | A1 * | 7/2016 | ........... B23K 20/10 |
| WO | WO-2016118393 | A2 * | 7/2016 | ........... E21B 47/101 |
| WO | WO-2016118393 | A3 * | 9/2016 | ........... E21B 47/101 |

OTHER PUBLICATIONS

International Search Report and Written Opinion dated Aug. 1, 2016, Corresponding to Application No. PCT/US2016/013341.

* cited by examiner

TRANSDUCERS AND ACOUSTIC EMITTERS FOR FIBER-OPTIC-BASED ACOUSTIC SENSING

BACKGROUND

Field of the Disclosure

Aspects of the present disclosure relate generally to acoustic sensing based on fiber optics and, more specifically, to transducers and emitters for fiber-optic-based acoustic sensing.

Description of the Related Art

Acoustic monitoring systems have been used in the oil and gas extraction industry to conduct surface-based seismic surveys. In these acoustic monitoring systems, arrays of acoustic sensors are deployed to form a grid on the surface and an acoustic signal is sent from the surface into the ground. Characteristics of the acoustic waves reflected to the surface sensors by the different geological strata and delays associated with the acoustic waves are then analyzed to create an echographic image of the reservoir. With the development and deployment of optical-fiber-based monitoring technology, in-well monitoring has spread. Fiber optic sensors offer multiple advantages over traditional electric and electronic sensors for deployment in oil and gas wells, for example: light does not generate sparks; optical fiber cables typically have a very small profile that occupies less of the well's valuable area; optical fibers are made of glass, which is stable at elevated temperatures and more inert to chemicals typically found in a well; optical fibers can transport multiple signals simultaneously and easily differentiate these signals by their specific wavelengths and/or time of flight; and the optical fiber can itself constitute the sensing mechanism.

One of the parameters that can be measured on an optical fiber is axial strain. The impact of sound waves on the optical fiber creates small axial strains. These axial strains can be monitored by measuring the dynamic variation in time of the phase of a coherent optical signal coming from the same location along the optical fiber. Small variations in optical path length, or axial strain, may result in a proportional shift in the phase of the received optical signals. Point sensors have been used as the acoustic fiber optic sensors in oil and gas wells. The point sensors may be composed of an acoustic fiber cavity created between two low-reflective structures embedded in the optical fiber (e.g., two fiber Bragg gratings (FBGs)) that is wrapped around an acoustically swell-able accelerometer, for example, constituting a geophone. In this case, the optical fiber cable was conventionally only used to transmit optical signals.

With advances in optical components, distributed acoustic sensing (DAS) technology, which is based on coherent Rayleigh scattering back reflections, has emerged. DAS technology is based on sending a coherent pulse of laser light down the fiber, sequentially measuring the phase of Rayleigh backscattering at high frequency, and associating consecutive fiber segments to each signal. By monitoring the phase variations of the Rayleigh backscattered light for the fiber segments, the fiber is effectively divided into consecutive acoustic sensors.

One example of a fiber-optic-based distributed acoustic sensor that uses coherent Rayleigh scattering is described in U.S. Pat. No. 5,194,847, for example. Distributed acoustic sensors have also been utilized for in-well deployments.

Traditionally, acoustic transducers used downhole have been piezo-based, such as those described in U.S. Pat. No. 7,036,363. Acoustic resonators were integrated into the fiber optic cable mostly to amplify certain frequency ranges as described in US 2012/0111104, US 2013/0319121, and US 2014/0262594. US 2006/0239603 describes a generic system configuration for perimeter disturbance monitoring using various unspecified sensors generating stimuli along and onto an optical fiber acoustic system. U.S. Pat. No. 8,661,907 describes a similar generic approach, but specifies using a coherent Rayleigh-scattering-based system and actuators coupled to the optic cable generating acousto-mechanical signals. U.S. Pat. Nos. 6,986,276; 7,607,361; and 7,926,360 describe using devices (e.g., a venturi device) directly immerged into a flowing fluid to generate turbulences and to enhance the sound generated within an acoustic flowmeter. U.S. Pat. No. 7,072,044 also describes immerging a device into a flowing fluid (e.g., a fiber optic microphone in a tubular probe) and monitoring for sounds indicative of sand particles hitting the microphone to detect the presence of the particles.

Downhole acoustic emitters have been integrated into drilling heads, logging tools, or pigs, as described in U.S. Pat. No. 8,408,064. US 2014/0204712 describes using a traditional electrical acoustic emitter, but stimulated by an optical trigger signal. U.S. Pat. No. 6,995,352 describes using fiber optic acoustic cavities to monitor the position of a downhole valve, but based on a two-chamber pressure differential exerting a pure strain stimulus onto the sensing cavity. US 2014/0036627 describes using the whistling sound of a conduit leaking to detect the leak, where the location of the leak is determined by moving the acoustic logging tool along the conduit. This published application also describes applying a similar method to detect the location of fracked zones based on whistling of fluid flowing through the created cracks in the reservoir. US 2013/0333474 and US 2014/0069173 describe a similar method of leak detection, but using an array of acoustic sensors (namely DAS) deployed along the conduit. US 2013/0233537 describes using the array of acoustic sensors approach to the fracked zones detection described above.

SUMMARY

The systems, methods, and devices of the disclosure each have several aspects, no single one of which is solely responsible for its desirable attributes. Without limiting the scope of this disclosure, some features will now be discussed briefly. After considering this discussion, and particularly after reading the section entitled "Detailed Description," one will understand how the features of this disclosure provide advantages that include generating acoustic signals in a predictable manner and that can be perceived by an acoustic monitoring system deployed in proximity by fluid flow activated acoustic actuators (referred to herein as "whistles") and/or mechanical shock activated acoustic actuators (referred to herein as "bells"). These actuators may be used as transducers to proportionally transform various measurands into acoustic signals and/or can be used as emitters that can be remotely modulated.

Aspects of the present disclosure may be used in combination with arrays of acoustic sensors, particularly fiber-optic-based acoustic sensors. Aspects may also be used for oil and gas wells with a deployed fiber-optic-based acoustic monitoring system, such as a distributed acoustic sensing (DAS) system. The whistle transducers may be used for monitoring fluid flow properties, which are particularly significant in these well operations, while the bell transducers may be used for monitoring health and functionality of the equipment and operations. The transducers may be passive (i.e., directly stimulated by the measurand) or active (i.e., stimulated by something other than the measurand, such as from the surface, but reacting to the measurand). The actuators may also be used as downhole emitters modulated at the surface, for example, to enable echographic and sonar surveys from within the well to derive properties of the media in which the generated acoustic waves travel.

Aspects of the present disclosure provide a method of measuring a non-acoustic parameter (e.g., in a wellbore). The method generally includes sensing the non-acoustic parameter with a mechanical transducer configured to generate an acoustic signal related to the non-acoustic parameter, detecting the generated acoustic signal with an acoustic sensing system, and determining a value of the parameter based on the detected acoustic signal.

Aspects of the present disclosure provide a method of determining at least one downhole property. The method generally includes mechanically stimulating a mechanical transducer to generate an acoustic signal related to an amount of stimulation, detecting the generated acoustic signal with an acoustic sensing system, and determining the downhole property based on the detected acoustic signal.

Aspects of the present disclosure provide an apparatus for measuring a non-acoustic parameter (e.g., in a wellbore). The apparatus generally includes means for sensing the non-acoustic parameter with a mechanical transducer configured to generate an acoustic signal related to the non-acoustic parameter, means for detecting the generated acoustic signal with an acoustic sensing system, and means for determining a value of the non-acoustic parameter based on the detected acoustic signal.

Aspects of the present disclosure provide an apparatus for determining at least one downhole property. The apparatus generally includes means for mechanically stimulating a mechanical transducer to generate an acoustic signal related to an amount of stimulation, means for detecting the generated acoustic signal with an acoustic sensing system, and means for determining the downhole property based on the detected acoustic signal.

Aspects of the present disclosure provide a system for determining at least one downhole property. The system generally includes a mechanical transducer configured to sense the non-acoustic parameter and generate an acoustic signal related to the non-acoustic parameter; an acoustic sensing device configured to detect the generated acoustic signal; and at least one processor configured to determine a value of the non-acoustic parameter based on the detected acoustic signal.

Aspects of the present disclosure provide a system for determining at least one downhole property. The system generally includes at least one processor configured to control mechanical stimulation of a mechanical transducer to generate an acoustic signal related to an amount of stimulation; and an acoustic sensing device configured to detect the generated acoustic signal, wherein the at least one processor is further configured to determine the downhole property based on the detected acoustic signal.

For some aspects, the acoustic sensing system may be a distributed acoustic sensing (DAS) system based on Rayleigh backscattering.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

Aspects of the present disclosure provide methods and apparatus for enhancing the use of an acoustic monitoring system by transducing other, non-acoustic parameters or by generating defined acoustic signals using fluid-flow-activated acoustic transducers (e.g., whistles) or mechanical shock acoustic transducers (e.g., bells). These acoustic transducers may be used in oil and gas wells on a permanent basis to monitor non-acoustic parameters with an installed acoustic monitoring system. These acoustic transducers may also be converted into or used as downhole emitters, which may be surface activated, to perform echographic surveys without interrupting the normal operations.

An Example Downhole Sensing System

Figure 1:
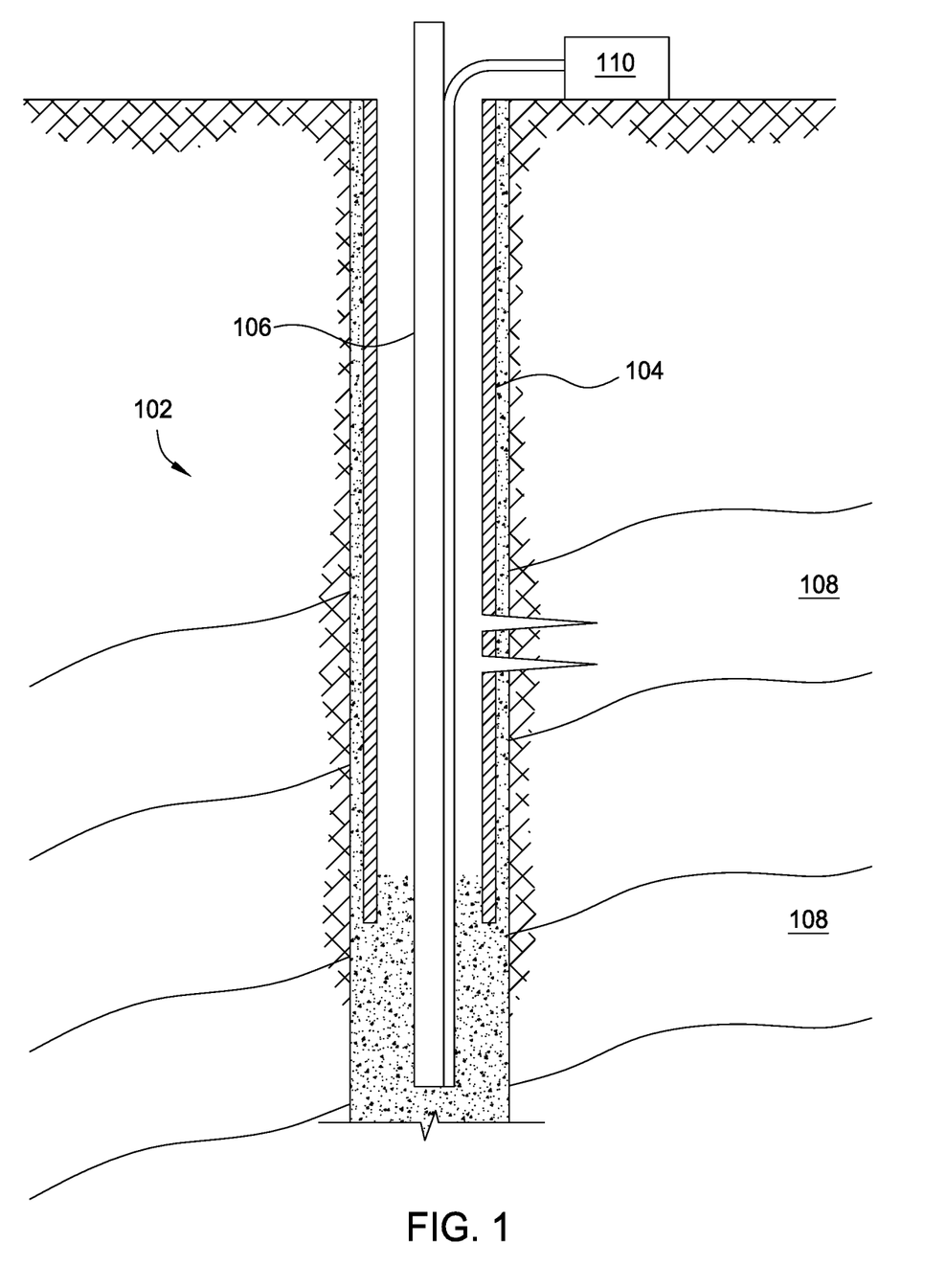
FIG. 1 is a schematic cross-sectional view of an example wellbore having a casing and production tubing with an optical waveguide for acoustic sensing deployed downhole and axially with respect to the casing and tubing, in accordance with certain aspects of the present disclosure.

FIG. 1 is a schematic cross-sectional view illustrating an example acoustic sensing system for use downhole. The sensing system generally includes a wellbore 102, casing 104, production tubing 106, a sensing device 110, and an optical waveguide 112 (e.g., disposed in an optical cable). At least a portion of the system may be disposed adjacent one or more reservoirs 108 downhole.

The wellbore 102 may have casing 104 disposed within, through which production tubing 106 may be deployed as part of a wellbore completion. The sensing device 110 may be used to perform sensing and measurements related to the wellbore 102. Properties of the wellbore 102, a wellbore completion (e.g., casing, cement, production tubing, packers), and/or downhole formations and interstitial fluid properties surrounding or otherwise adjacent to the wellbore 102 may be monitored over time based on the sensing. Further, hydrocarbon production may be controlled, or reservoirs 108 may be managed, based on these monitored properties.

The optical waveguide 112, such as an optical fiber, may be disposed axially with respect to the casing 104 or the production tubing 106. One or more lengths of the optical waveguide 112 intended for acoustic sensing may have multiple Bragg gratings (e.g., fiber Bragg gratings (FBGs)) disposed therein. The Bragg gratings may be written directly or spliced into the optical waveguide 112, for example. The acoustic sensing system may perform acoustic sensing along the optical waveguide 112 at various sensing regions between the locations of the Bragg gratings.

The sensing system may employ a single fiber or multiple fibers in the same well and/or one or more different wells. For example, multiple fibers may be utilized in different sections of a well, so that sensing may be performed in the different sections.

An acoustic energy source may generate and emit acoustic signals downhole. The acoustic signals may interact with the wellbore 102, the wellbore completion, and/or various downhole formations adjacent the wellbore, leading to transmitted, reflected, refracted, and/or absorbed acoustic signals. These acoustic signals may mechanically deform the optical waveguide 112 such that the optical propagation distance changes (e.g., the length of a waveguide section between Bragg gratings is perturbed by the force of acoustic pressure thereon).

The sensing system may include a sensing device 110 to introduce light (e.g., an optical pulse), using a pulsed laser, for example, into the optical waveguide 112 to interrogate the Bragg gratings disposed therein. The interrogation is based on measurement of interference of two optical pulses at least partially reflected from the Bragg gratings. The interferometric approaches may include any suitable interrogation technique (e.g., using Mach Zehnder, Michaelson, Fabry Perot, ring resonators, polarimetric, and/or two-mode fiber interferometers). For other aspects, the optical source may be separate from the sensing device 110. The sensing device 110 may include: (1) an optical-to-electrical converter (e.g., a photodiode) to convert the optical signals reflected from the Bragg gratings to electrical signals; and (2) one or more processing units for performing signal processing and analysis on the converted reflected signals. In this manner, the sensing system may be used to interferometrically measure any change in length, due to acoustic pressure, of a section of the optical waveguide 112 between Bragg gratings.

For other aspects, Rayleigh backscattering may be used along the optical waveguide 112, such that the optical waveguide may be used for DAS, measuring disturbances in scattered light that may be propagated within the waveguide (e.g., within the core of an optical fiber). The disturbances in the scattered light may be due to the transmitted, reflected, and/or refracted acoustic signals. The acoustic signals may change the index of refraction of the waveguide or mechanically deform the waveguide such that the optical propagation time or distance, respectively, changes. For some aspects, if the generated acoustic signals are measured at or near the acoustic source (or at some given point), as well as some distance away from the source, then the absorbed energy may also be understood and provide useful information.

The system may have a spatial resolution of one meter, for example, along the optical waveguide 112, depending on the pulse width of the source. Thus, the optical waveguide 112 may be capable of producing the functional equivalent of tens, hundreds, or even thousands of acoustic sensors along the optical waveguide 112. The bandwidth of the signal that may be measured is typically within the acoustic range (i.e., 20 Hz-20 kHz), but a DAS system may be capable of sensing in the sub-acoustic range (i.e., <20 Hz) and ultrasound range (i.e., >20 kHz).

For some aspects, the sensing system may utilize an optical fiber within a suspended cable deployed in the production tubing 106, in a cable disposed in an annulus between the production tubing 106 and the well casing 104 (e.g., coupled to the outside of the production tubing 106), or in a cable disposed in an annulus between the casing 104 and the walls of the borehole. The acoustic source may be generated from an active acoustic source deployed downhole or from a passive acoustic source.

Example Transducers and Acoustic Emitters for Fiber-Optic-Based Acoustic Sensing Fiber optics may be used to measure vibration and acoustic front waves by measuring the dynamic variation of the minute axial strains on the fiber caused by these waves. These minute axial strains on the fiber cause minute local fiber length changes, on the order of nanometers, and can be observed by measuring phase shift of coherent optical signals that are returned from a constant location along the fiber.

One fiber optic acoustic technology that is based on phase shift measurements involves semi-reflective cavities. The semi-reflective cavities may be fabricated by placing two semi-transparent mirrors (typically a fiber Bragg grating (FBG)) into the optical fiber core. The mirrors create a defined fiber segment with two ends from which coherent light can be reflected. The reflected light can be measured to determine relative phase variations and, from the relative phase variations, the dynamic segment length changes.

Another fiber optic acoustic technology that is based on phase shift measurements involves distributed acoustic sensing (DAS). DAS relies on Rayleigh backscattering of a coherent pulse launched into the optical fiber. A pulse of coherent light is sent along the optical fiber, and the phase of the light reflected by Rayleigh backscattering may be measured periodically and at high frequency. Since the speed of light in the fiber is known, the origin (e.g., location on the optical fiber) of a Rayleigh signal (e.g., the Rayleigh backscattered light) can be associated with a specific fiber segment based on the flight time since the pulse's impulsion. Local phase shift is obtained by comparing the phase measurements from each fiber segment in time.

The small profile and long reach of fiber optic cable, as well as the inert nature of glass towards high temperature and chemicals found in oil and gas wells, make fiber optic cable particularly suitable for applications involving monitoring oil and gas extraction processes. Acoustic monitoring is a non-intrusive monitoring technique, which makes acoustic monitoring particularly suitable for monitoring oil and gas extraction in situ and in operation. Since this acoustic monitoring is a relatively new technology, development of certain components to reach the full potential of this in situ monitoring platform are desirable. One desirable component for acoustic monitoring is transducers able to proportionally transform non-acoustic parameters into acoustic signals that can be monitored in situ by the system. Another desirable component for acoustic monitoring is acoustic sources whose waves' propagation can be monitored. The components may be useful to enable the fully non-intrusive nature of acoustic monitoring.

Aspects of the present disclosure provide mechanical structures that are configured to emit controlled acoustic signatures that are proportional to the effect and/or measurand targeted. These acoustic signatures can be captured by the acoustic system deployed in the well and/or along a conduit. These mechanical structures need not be fixed to the acoustic monitoring system or located specifically according thereto.

Example "Whistle" Transducers for Fiber-Optic-Based Acoustic Sensing

Some aspects of the present disclosure provide transducers that emit an acoustic signal that is proportional to the fluid passing though the mechanical acoustic transducer (referred to herein as "whistles").

Figure 2:
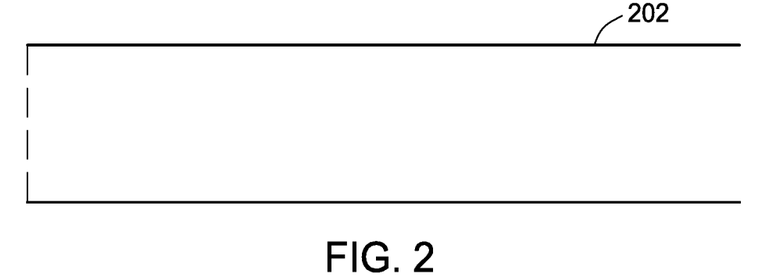
FIG. 2 illustrates an example injection port.

FIG. 2 illustrates an example injection port 200. Typically, an injection port 200 (e.g., such as a superheated steam injection port), is simply a tubular 202 that ends at a precise location along the well. The injection port 200 may be regulated by a surface valve.

Figure 3:
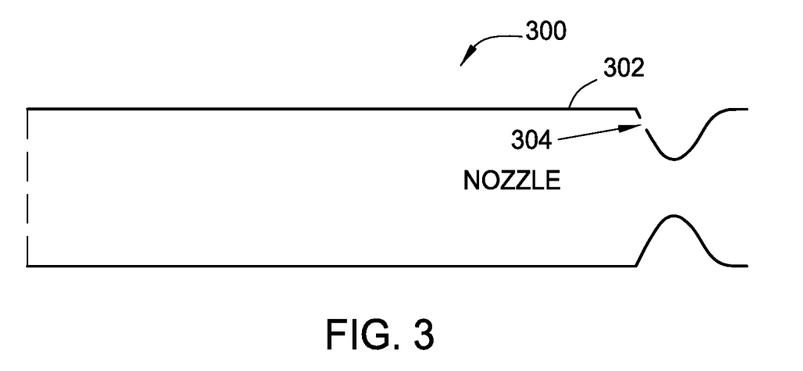
FIG. 3 illustrates an example whistle transducer to measure fluid flow rate, in accordance with certain aspects of the present disclosure.

FIG. 3 illustrates an example whistle transducer 300 to measure fluid flow rate, in accordance with certain aspects of the present disclosure. As shown in FIG. 3, the whistle transducer 300 may be placed at the injection point by modifying an end of the injection port 302 to include a whistling nozzle 304. The pitch and level of sound emitted by the whistle transducer 300 at whistling nozzle 304 may be proportional to the flow rate of the injected steam at that specific injection port.

A fiber-optic-based distributed acoustic sensing (DAS) device deployed somewhere along the well may sense the emitted acoustic signature of the whistle transducer 300 and derive the flow rate of the steam at that injection port, as well as determine the relative location along the fiber optic acoustic probe. Thus, the whistle transducer 300 may be used as a flowmeter.

Use of the whistle transducer 300 to measure injection port flow rate may be particularly useful for wells having a series of injection ports, where the whistle transducer 300 may be used to establish relative injected proportions of the injection ports This may be particularly useful when the relative flow rates are used in combination with injected fluid distribution mechanisms in order to improve operation of the well.

Figure 4:
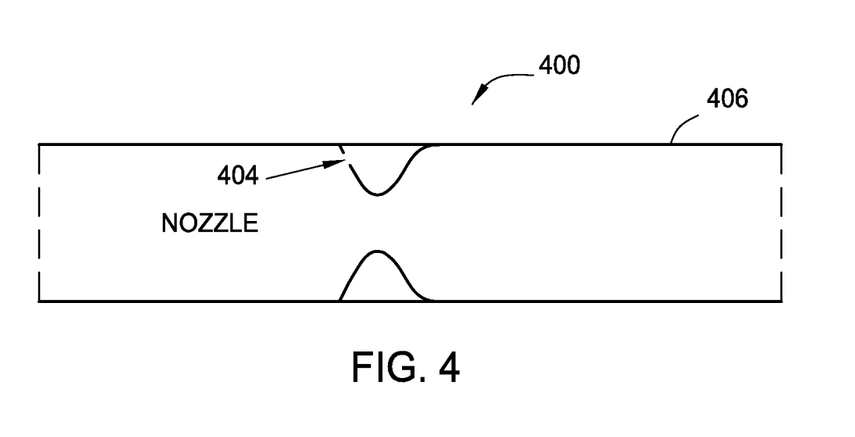
FIG. 4 illustrates an example whistle conduit to measure fluid flow rate, in accordance with certain aspects of the present disclosure.

FIG. 4 illustrates an example whistle transducer 400 embedded in a whistle conduit 406, which may be used to measure fluid flow rate, in accordance with certain aspects of the present disclosure. A fluid (a gas or a liquid) may flow in the conduit at a known flow rate, even in a loop back to the surface. The density of the fluid(s) may vary according to the phase proportion, and thus, the speed (i.e., flow rate) of the fluid(s) flowing within the nozzle 404 may also vary. Thus, relative phase proportion of the fluid(s) flowing in the whistle conduit, such as steam quality, can also be determined by the pitch and level of the sound emitted by the whistle transducer 400.

The whistle transducer 400 may be used to measure local temperature. For example, the nozzle 404 may be a two-material nozzle with two different thermal expansion coefficients. Thus, a width of the gap in the two-material nozzle 404 may vary proportionally with the temperature. Alternatively, the upper lip of the whistle transducer 400 may be deflected proportional to the differential pressure between the outside and the inside of the conduit 406. The deflection of the upper lip may vary the width of the gap in the nozzle 404. Variation in the width of the gap in the nozzle 404 results in varying the pitch and level of the sound emitted from the whistle transducer 400.

According to certain aspects, although not shown in FIG. 3 or FIG. 4, other whistle designs may be used.

According to certain aspects, the acoustic monitoring system may monitor the amplitude of acoustic signals emitted from the bell transducers, in addition or in alternative to monitoring the frequency of the emitted acoustic signals. For example, for a fixed nozzle, an increase in the flow of fluid through the nozzle may increase the amplitude of the emitted sound.

Whistle transducers may be particularly suited to monitor properties of fluid flows, such as multiphase flow metering in a conduit as described above. Phase properties may also be determined by the speed of sound through the fluid, which is dependent on the fluid density. For example, a whistle transducer and a fiber optic acoustic probe may be placed on each side of the fluid (e.g., on opposite sides of the conduit). This approach may also be used to characterize any medium, as long as the whistle signal is known and can reach the acoustic probe at a detectable level. For example, by placing the whistling transducer on opposite sides of a deployed DAS fiber optic cable, the local injected steam rate and the steam quality can be measured.

According to certain aspects, arrays of whistling transducers (e.g., such as whistle transducer 300) may be placed between the distributed acoustic probe (e.g., DAS fiber optic cable) and inflows. The acoustic emissions (e.g., sound) from the array of whistling transducers can be amplified in an effort to enhance monitoring and characterization of the acoustic emissions. This approach may be used to establish inflow profiles along the well or to detect casing leaks. This approach may also be used during hydraulic fracking to monitor fracking fluid flow entering and exiting the formation, as well as reservoir fluid inflows afterwards.

One variant of this approach may be monitoring whistling caused by fracking cracks to establish their geometry, lengths, and/or diameters and to determine flow rates. Using an array of whistling transducers could be useful for applications involving monitoring of the health and functionality of equipment that can whistle, thereby indicating its status, such as leaking valves, packers, and/or pumps. Inflow monitoring can also be used to establish the effectiveness of operational interventions, such as solvent wash for de-waxing or de-skinning.

Example "Bell" Transducers for Fiber-Optic-Based Acoustic Sensing

Another aspect of the present disclosure provides for mechanical acoustic transducers (referred to herein as "bells") that are capable of emitting an acoustic signal proportional to a mechanical shock on the transducers. In this manner, the bells function as mechanical acoustic transducers.

Figure 5:
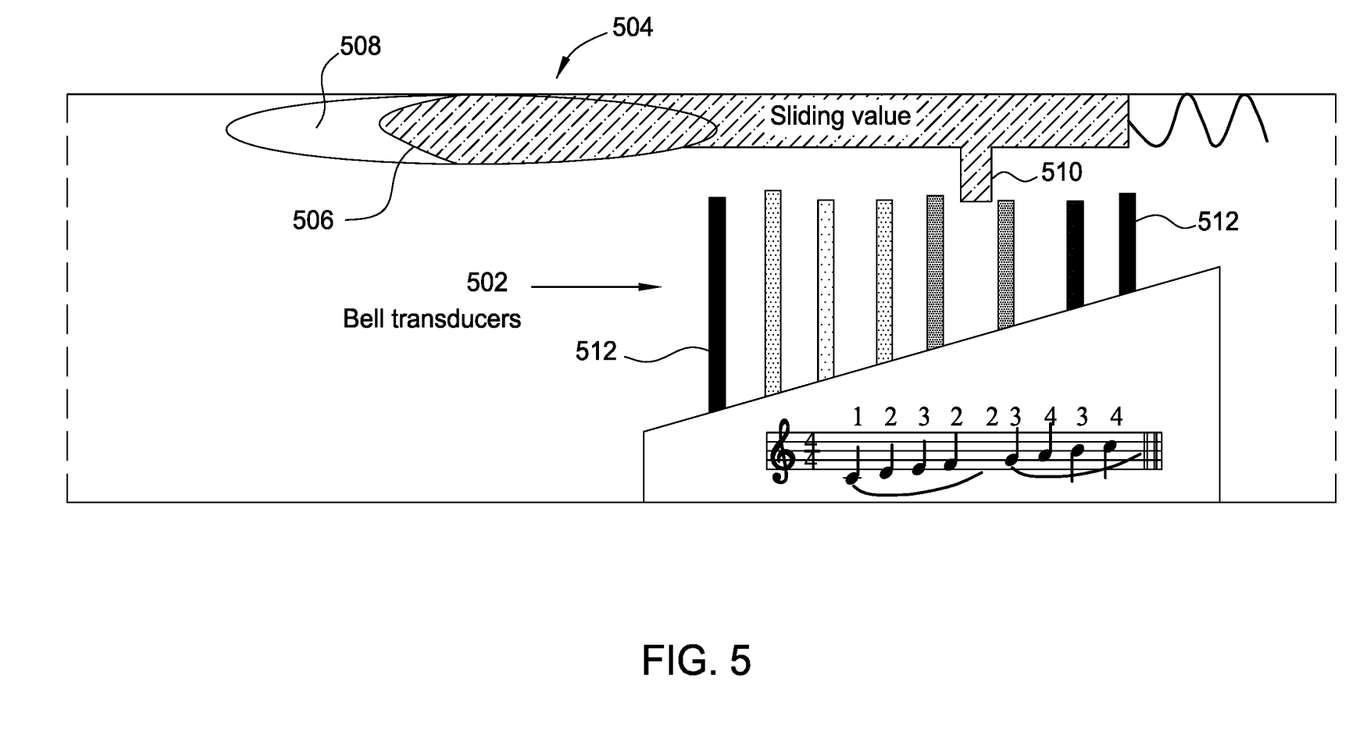
FIG. 5 illustrates an example bell transducer to monitor the position of a valve, in accordance with certain aspects of the present disclosure.

FIG. 5 illustrates an example system using a set of bell transducers 502 to sense a degree of openness of a sliding valve 504, in accordance with certain aspects of the present disclosure. An end of the sliding valve 504 may include a sliding shutter 506. As the sliding shutter 506 of the sliding valve 504 moves in either direction within the sliding valve orifice 508, an appendage 510 of the sliding shutter 506 moves along with the sliding valve 504 and may come into contact with (i.e., hit) various metallic bars 512 composing the set of bell transducers 502. Each metallic bar 512 may be designed to emit a different tone when struck. The metallic bars 512 may be arranged to correspond to the sliding shutter 506 position, such that the different tones emitted by the metallic bars 512 correspond to positions of the sliding shutter 506.

Thus, the acoustic monitoring system may be used to monitor "notes" (e.g., the frequency or pitch of the tones) emitted from the set of bell transducers 502 as the sliding shutter 506 moves causing the appendage 510 to strike the metallic bars 512, and the sliding shutter 506 position may be determined along with the corresponding degree of openness of the sliding valve 504.

Since bell transducers may rely on a solid element hitting the bell transducer, the bell transducer may be particularly suited to equipment status monitoring. Bell transducers may also be used for valves, including as a response for a control loop, fracking ball landing, or a pump vibration amplitude limit switch, for example. Another example application involves using a bell transducer to determine the level of solid particles within a flowing fluid by simply placing a solid surface (e.g., a gong or other cymbal) within the flow designed to resonate proportionally with the number of particles hitting this surface, the particles' concentration, and the velocity of the impacts (flow rate).

According to certain aspects, the acoustic monitoring system may monitor the amplitude of acoustic signals emitted from the bell transducers, in addition or in alternative to monitoring the frequency of the emitted acoustic signals.

Example Acoustic Emitters for Fiber-Optic-Based Acoustic Sensing

According to certain aspects, the bell and whistle transducer described above may also be used as in situ acoustic emitters, rather than transducers. For example a bell or whistle transducer may be linked to the surface via a conduit. The bell or whistle transducer's particular stimulus (e.g., fluid flowing therethrough, or impact rate and amplitude) can be modulated from the surface. The propagation of the acoustic signatures from the emitters may be monitored by the acoustic monitoring system deployed in or adjacent the well. The acoustic signatures may be transmitted directly from the source (e.g., bell or whistle transducer) through a medium and to the sensing elements. Alternatively, the acoustic signatures may echo from the source towards semi-reflective strata and back to the sensing elements. In either case, sonar array processing methods may be used to determine properties of the traversed media using speed of sound and acoustic absorption/dispersion calculations.

This approach can be used for determining the various phases present within the well's fluids (e.g., steam quality), formation strata (e.g., flood chambers and fracked zone characteristics, such as crack sizes and densities), and/or equipment location and status.

In-well acoustic sources (i.e., emitters) may enable improved subterranean imaging due to a close signal source and an additional "point of view." Such in-well acoustic sources may also enable not only reflective measurements (i.e., echoes), but also transmissive measurements. For example, a fracked zone may be characterized using acoustic sources in a particular well and an acoustic sensing array in an adjacent well located elsewhere (e.g., on the other side of the fracked zone). Another advantage to using in-well bell and whistle transducers as acoustic sources rather than conventional emitters is that the well's operations may not be interrupted to perform a seismic survey, thus providing a better assessment of the operating conditions.

Figure 6:
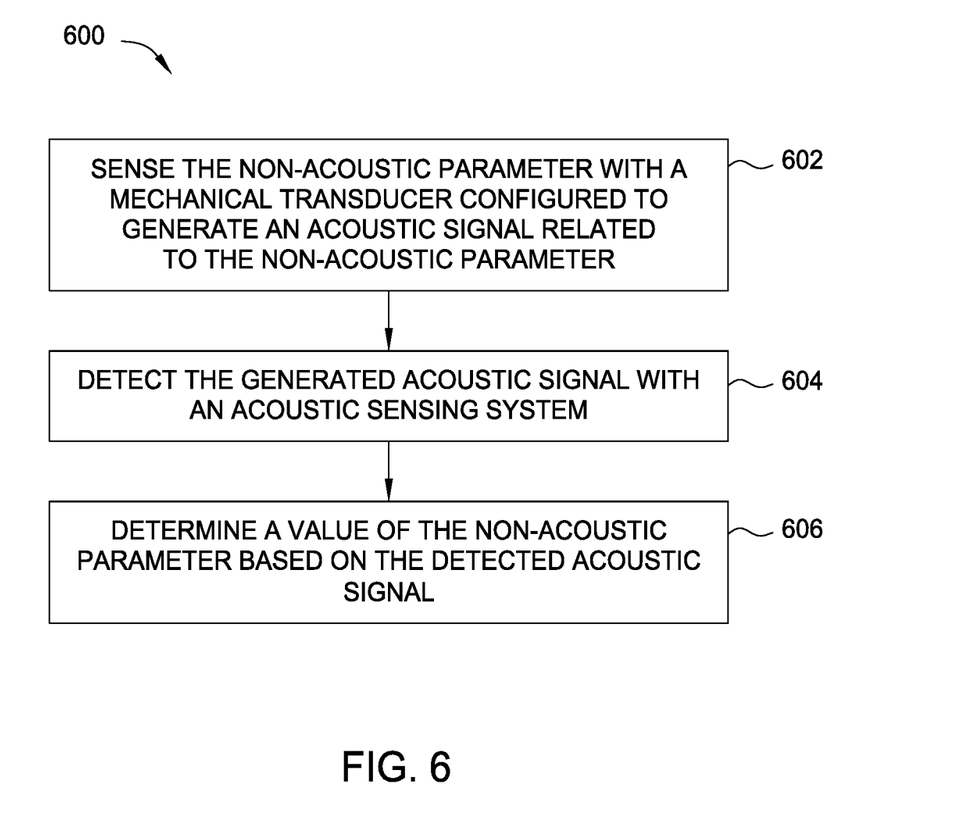
FIG. 6 is a flow diagram showing example operations for measuring a non-acoustic parameter, in accordance with certain aspects of the present disclosure.

Example Operations for Fiber-Optic-Based Acoustic Sensing Using Bell and/or Whistle Transducers FIG. 6 is a flow diagram showing example operations 600 for measuring a non-acoustic parameter, in accordance with certain aspects of the present disclosure. The operations 600 may be performed by a sensing device (e.g., such as sensing device 110). The operations 600 may begin, at 602, by sensing the non-acoustic parameter with a mechanical transducer configured to generate an acoustic signal related to the non-acoustic parameter. At 604, the generated acoustic signal is detected with an acoustic sensing system. At 606, a value of the non-acoustic parameter is determined based on the detected acoustic signal.

Figure 7:
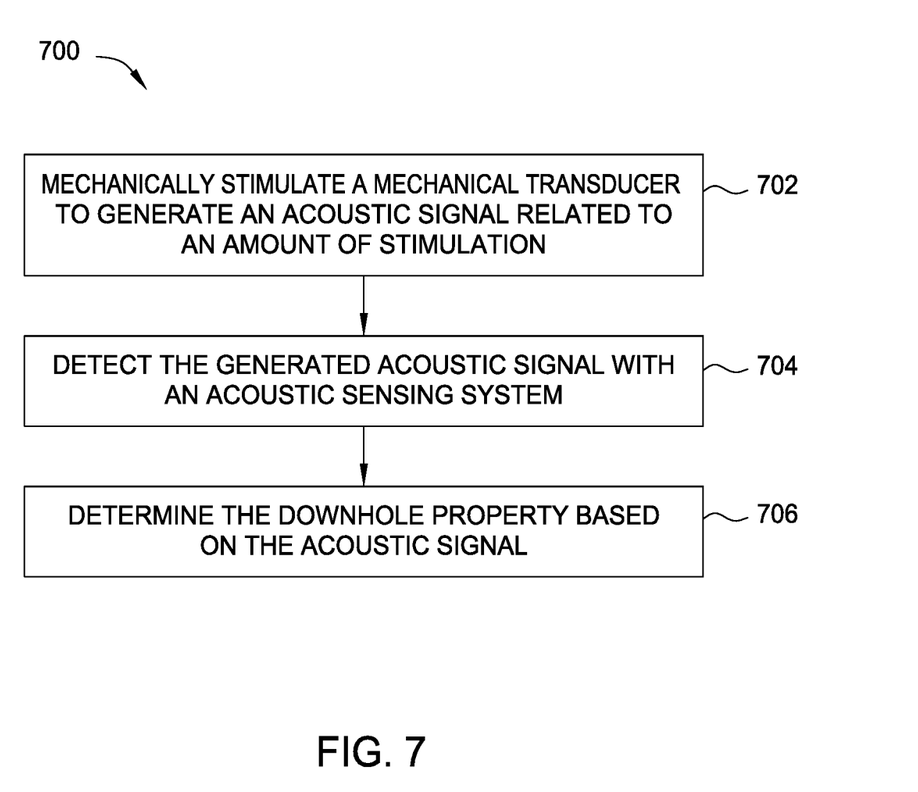
FIG. 7 is a flow diagram showing example operations for determining a downhole parameter, in accordance with certain aspects of the present disclosure.

FIG. 7 is a flow diagram showing example operations 700 for determining at least one downhole property, in accordance with certain aspects of the present disclosure. The operations 700 may be performed by a sensing device (e.g., such as sensing device 110). The operations 700 may begin, at 702, by mechanically stimulating a mechanical transducer to generate an acoustic signal related to an amount of stimulation. At 704, the generated acoustic signal is detected with an acoustic sensing system. At 706, the downhole property is determined based on the detected acoustic signal.

Aspects of the present disclosure provide techniques and apparatus for generating controlled acoustic signals using passive mechanical acoustic transducers. Some aspects include using fluid flow to activate transducers (whistles), using shock of a solid to generate noise (bells), using quiet parameters to proportionally activate a transducer's response, externally modulating the activation of transducers to create embedded acoustic signal sources, using the transducers to monitor fluid flow in a conduit, using the transducers inserted into oil and gas wells, and/or using the transducers in combination with an array of acoustic sensors deployed in or along the outside of a conduit and/or an adjacent well.

Some aspects of the present disclosure entail using transducers as acoustic transducers to measure quiet (or non-acoustic) parameters in a well. These may include, but are not limited to the following: (1) fixing the transducers at precise locations, including onto downhole equipment and tools; (2) using the transducers as multi-phase flowmeters, including measuring steam quality; (3) using the transducers for inflow characterizations, including fracked zones (e.g., using the transducers to (i) amplify and/or establish flow rates, including using natural cracks whistling for determining its geometry in fracked zones, casing crack and inflow; (ii) monitor equipment's status, such as valves, pumps and packers whistling or valve position, pump vibration amplitude, frack balls landing and casing movement by bells; or (iii) evaluate the effectiveness of an operational intervention, such as a flooding stimulation, fracking, and washing for de-waxing or de-skinning); and (4) monitoring propagation of a transducer's acoustic signal to determine properties of media traversed, including using sonar array processing analysis based on speed of sound, attenuation, and dispersion.

Some aspects of the present disclosure involve using mechanical acoustic transducers as acoustic signal sources in a well, which may be modulated from the surface. Using these sources may entail permanently installing them in a well; fixing the acoustic sources at precise locations, including onto downhole equipment and tools; using the acoustic sources in combination with an array of acoustic sensors; using the acoustic sources during well operation; monitoring propagation of acoustic signals generated to determine properties of media traversed, including using sonar array processing analysis based on speed of sound, attenuation, and dispersion (e.g., including the following: (i) directly between acoustic signal source and acoustic sensors, including if they are in different wells; (ii) reflected from the various reservoir strata to form echographic mapping; (iii) to mapping flooded chambers, including steam chambers; (iv) fracked zones, including determining cracks characteristics, such as length, diameter, and density; and (v) determining the phase proportion of fluid zones, including steam quality).

For some aspects, the transducers may be used to evaluate the effectiveness of operational interventions, including as a response to optimize or in a feedback loop. For some embodiments, the transducers may be employed to monitor the health of downhole equipment, including generating automated alarms and performing retro-actions based thereon.

The aspects described above, and variations thereof, include different approaches to generating acoustic signals with mechanical passive acoustic transducers in an effort to enhance acoustic system monitoring, to enable measuring non-acoustic parameters, and to perform downhole seismic surveys. These approaches can be used separately or in any combination to significantly increase the performance of a global monitoring system.

As used herein, the term "determining" encompasses a wide variety of actions. For example, "determining" may include calculating, computing, processing, deriving, and the like. As used herein, a phrase referring to "at least one of" a list of items refers to any combination of those items, including single members.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Any of the operations or algorithms described above, such as operations 600 and 700, may be included as instructions in a computer-readable medium for execution by the sensing device 110 or any suitable processing system. The computer-readable medium may comprise any suitable memory or other storage device for storing instructions, such as read-only memory (ROM), random access memory (RAM), flash memory, an electrically erasable programmable ROM (EEPROM), a compact disc ROM (CD-ROM), or a floppy disk.

While the foregoing is directed to aspects of the present disclosure, other and further aspects of the disclosure may be devised without departing from the basic scope thereof, and the scope thereof is determined by the claims that follow.

The invention claimed is:

1. A method of measuring a non-acoustic parameter, comprising:
   sensing the non-acoustic parameter with a mechanical transducer configured to generate an acoustic signal related to the non-acoustic parameter;
   detecting the generated acoustic signal with an acoustic sensing system; and
   determining a value of the non-acoustic parameter based on the detected acoustic signal, wherein:
   the mechanical transducer comprises a nozzle configured to emit sound as fluid flows therethrough;
   the nozzle comprises a gap;
   the sound is emitted from the gap;
   the gap comprises an upper lip comprising a first material having a first thermal expansion coefficient and a lower lip comprising a second material having a second thermal expansion coefficient that is different from the first thermal expansion coefficient; and
   the determination of the value of the non-acoustic parameter is based on a frequency of the emitted sound.

2. The method of claim 1, wherein:
   the determination of the value of the non-acoustic parameter is based on an amplitude of the emitted sound.

3. A method of measuring a non-acoustic meter, comprising:
   sensing the non-acoustic parameter with a mechanical transducer configured to generate an acoustic signal related to the non-acoustic parameter;
   detecting the generated acoustic signal with an acoustic sensing system; and
   determining a value of the non-acoustic parameter based on the detected acoustic signal, wherein:
   the mechanical transducer is configured to emit sound in response to a mechanical shock on the mechanical transducer; and the determination of the value of the non-acoustic parameter is based on the emitted sound.

4. The method of claim 3, wherein:
the mechanical transducer comprises a plurality of mechanical transducers, each mechanical transducer configured to emit sound at a different frequency in response to the mechanical shock; and
the determination of the value of the non-acoustic parameter is based on the frequency of the emitted sound.

5. The method of claim 1, wherein the non-acoustic parameter comprises at least one of flow rate, temperature, multi-phase flow properties, in-flow characterization, crack geometry in frack zones, casing cracks, pump vibration amplitude, valve position, or degree of valve openness.

6. The method of claim 1, wherein the determination of the value of the non-acoustic parameter is based on propagation of the generated acoustic signal through a medium via sonar array processing.

7. The method of claim 1, further comprising:
controlling a non-acoustic parameter to cause the mechanical transducer to generate the acoustic signal related to the non-acoustic parameter.

8. An apparatus for measuring a non-acoustic parameter, comprising:
means for mechanically sensing the non-acoustic parameter and generating an acoustic signal related to the non-acoustic parameter;
means for detecting the generated acoustic signal; and
means for determining a value of the non-acoustic parameter based on the detected acoustic signal, wherein:
the means for mechanically sensing and generating comprises means for emitting sound in response to a mechanical shock on the mechanical transducer; and
the means for determining is configured to determine the value of the non-acoustic parameter based on the emitted sound.

9. The apparatus of claim 8, wherein:
the means for mechanically sensing and generating comprises means for emitting sound as fluid flows therethrough; and
the means for determining is configured to determine the value of the non-acoustic parameter based on at least one of a frequency or an amplitude of the emitted sound.

10. The apparatus of claim 8, further comprising:
means for controlling a non-acoustic parameter to cause the means for mechanically sensing and generating to generate the acoustic signal related to the non-acoustic parameter.

11. A system for measuring a non-acoustic parameter, comprising:
a mechanical transducer configured to sense the non-acoustic parameter and generate an acoustic signal in relation to the non-acoustic parameter;
an acoustic sensing device configured to detect the generated acoustic signal; and
at least one processor configured to analyze the detected acoustic signal to determine a value of the non-acoustic parameter, wherein:
the mechanical transducer comprises a nozzle configured to emit sound as fluid flows therethrough;
the nozzle comprises a gap;
the sound is emitted from the gap;
the gap comprises an upper lip comprising a first material having a first thermal expansion coefficient and a lower lip comprising a second material having a second thermal expansion coefficient that is different from the first thermal expansion coefficient; and
the determination of the value of the non-acoustic parameter is based on a frequency of the emitted sound.

12. The system of claim 11, wherein the determination of the value of the non-acoustic parameter is based on an amplitude of the emitted sound.

13. A system for measuring a non-acoustic parameter, comprising:
a mechanical transducer configured to sense the non-acoustic parameter and generate an acoustic signal in relation to the non-acoustic parameter;
an acoustic sensing device configured to detect the generated acoustic signal; and
at least one processor configured to analyze the detected acoustic signal to determine a value of the non-acoustic parameter, wherein:
the mechanical transducer is configured to emit sound in response to a mechanical shock on the mechanical transducer; and
the processor is configured to determine the value of the non-acoustic parameter based on the emitted sound.

14. The system of claim 13, wherein:
the system comprises a plurality of mechanical transducers, each configured to emit sound at a different frequency in response to the mechanical shock; and
the processor is configured to determine the value of the non-acoustic parameter based on the frequency of the emitted sound.

15. A system for measuring a non-acoustic parameter, comprising:
a mechanical transducer configured to sense the non-acoustic parameter and generate an acoustic signal in relation to the non-acoustic parameter;
an acoustic sensing device configured to detect the generated acoustic signal; and
at least one processor configured to analyze the detected acoustic signal to determine a value of the non-acoustic parameter, wherein:
the mechanical transducer is disposed in a conduit downhole; and
the non-acoustic parameter comprises at least one of flow rate, temperature, multi-phase flow properties, in-flow characterization, crack geometry in frack zones, casing cracks, pump vibration amplitude, valve position, or degree of valve openness.

16. The system of claim 11, wherein the at least one processor is configured to analyze the detected acoustic signal based on propagation of the acoustic signal through a medium via sonar array processing.

17. The system of claim 11, wherein the at least one processor is configured to control a non-acoustic parameter to cause the mechanical transducer to generate the acoustic signal related to the non-acoustic parameter.

18. A method of measuring a temperature, comprising:
sensing the temperature with a mechanical transducer configured to generate an acoustic signal related to the temperature, wherein:
the mechanical transducer comprises a nozzle having a gap, wherein the nozzle is configured to emit sound as fluid flows therethrough, the sound being emitted from the gap as the generated acoustic signal;
the gap comprises an upper lip and a lower lip;
the upper lip comprises a first material having a first thermal expansion coefficient; and the lower lip comprises a second material having a second thermal expansion coefficient different from the first thermal expansion coefficient;

detecting the generated acoustic signal with an acoustic sensing system; and determining a value of the temperature based on the detected acoustic signal.

19. The method of claim 18, wherein the determination of the value of the temperature is based on a frequency of the emitted sound.

20. The method of claim 18, wherein the determination of the value of the temperature is based on an amplitude of the emitted sound.

21. A system for measuring a temperature, comprising:

a mechanical transducer configured to sense the temperature and generate an acoustic signal in relation to the temperature, wherein:

the mechanical transducer comprises a nozzle having a gap, wherein the nozzle is configured to emit sound as fluid flows therethrough, the sound being emitted from the gap as the generated acoustic signal;

the gap comprises an upper lip and a lower lip;

the upper lip comprises a first material having a first thermal expansion coefficient; and the lower lip comprises a second material having a second thermal expansion coefficient that is different from the first thermal expansion coefficient;

an acoustic sensing device configured to detect the generated acoustic signal; and at least one processor configured to analyze the detected acoustic signal to determine a value of the temperature.

22. The system of claim 21, wherein the determination of the value of the temperature is based on a frequency of the emitted sound.

23. The system of claim 21, wherein the determination of the value of the temperature is based on an amplitude of the emitted sound.

24. The system of claim 21, wherein the acoustic sensing device comprises a distributed acoustic sensing (DAS) system.

25. The system of claim 21, wherein the mechanical transducer is disposed in a conduit downhole.

26. The system of claim 25, comprising an array of mechanical transducers disposed along the conduit downhole, wherein the mechanical transducer is in the array of mechanical transducers.

27. The system of claim 21, wherein the mechanical transducer is disposed downhole on at least one of equipment or tools.

* * * * *